May 27, 1958 G. M. R. REURE ET AL 2,836,567
APPARATUS FOR GENERATING SMOKE, FOG, AEROSOLS
AND LAYERS OF GAS OR DISPERSIONS
Filed July 6, 1953 3 Sheets-Sheet 1
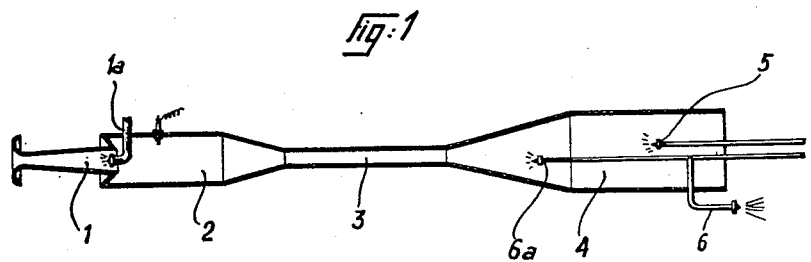
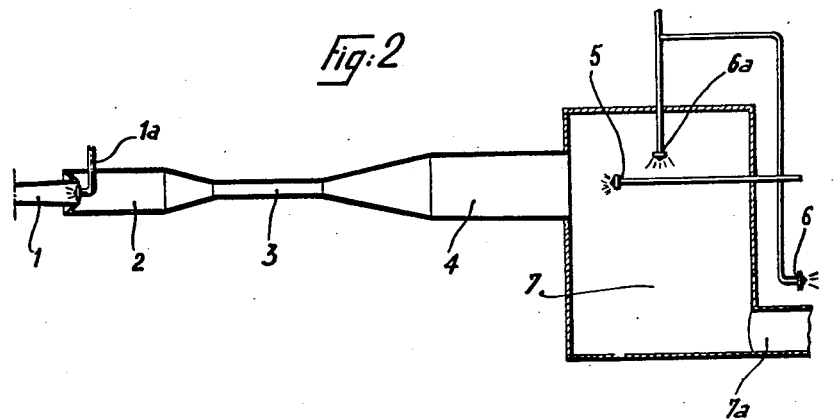
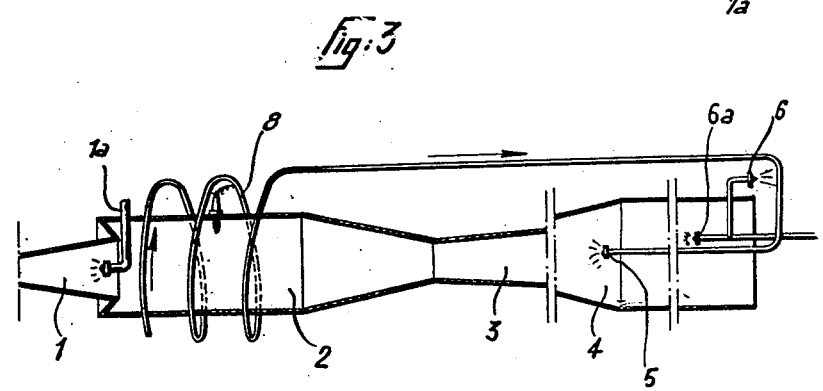
INVENTORS
Germain M. R. Reure
Francois G. Paris
By Watson, Cole, Grindle & Watson
ATTORNEYS

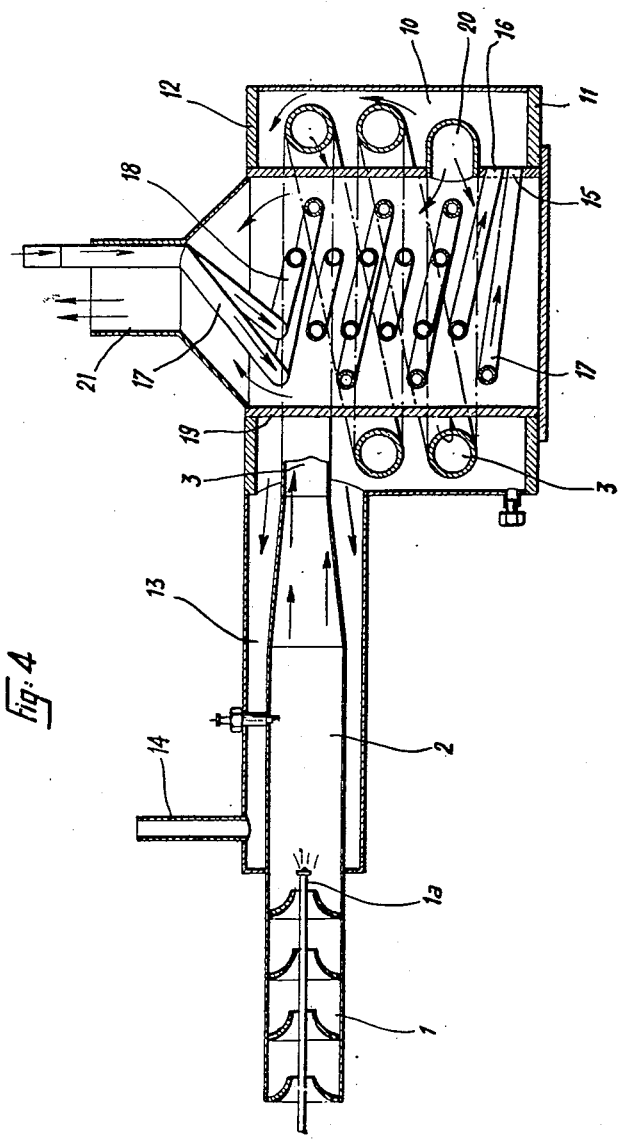

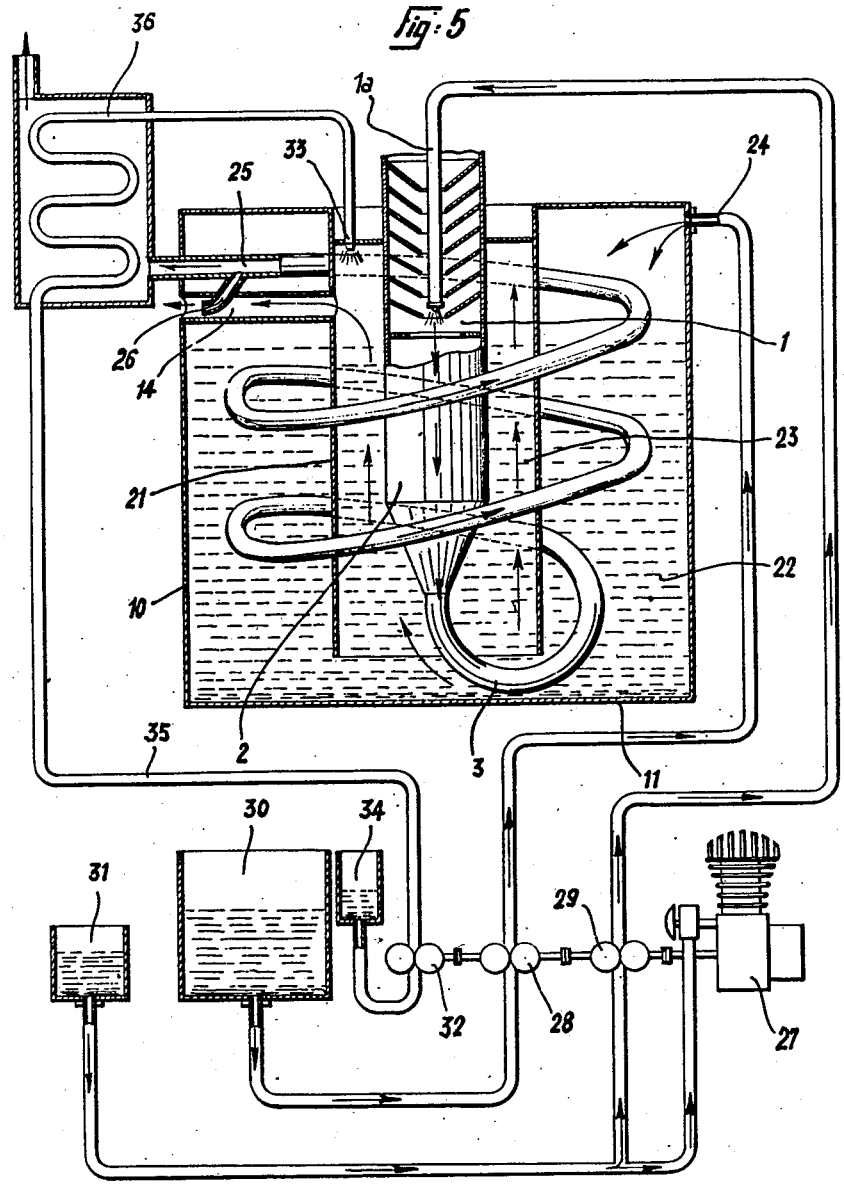

United States Patent Office 2,836,567
Patented May 27, 1958

2,836,567

APPARATUS FOR GENERATING SMOKE, FOG, AEROSOLS AND LAYERS OF GAS OR DISPERSIONS

Germain M. R. Reure, Vert-le-Petit, and François G. Paris, Chaville, France, assignors to Societe Nationale d'Etude et de Construction de Moteurs d'Aviation, Paris, France, a French company and Etat Francais, Ministere de la Defense Nationale, represented by the Directeur Central des Poudres, Paris, France Application July 6, 1953, Serial No. 366,325

Claims priority, application France July 25, 1952

5 Claims. (Cl. 252—359)

The object of the present invention is to describe a new method of generating smoke, fog, aerosols or layers of gas by the application of combustion chambers of the pulsatory type or of any other kind of generators of hot gases in which the heating effect is produced by combustion of a fuel in a current of air in motion, such as: turbo-jets, gas turbines, ram-jets or athodyds, etc.

The body which is to be dispersed in the atmosphere may be a liquid, a gas, a solid, a solution or a suspension of one in the other. It is vaporised by the heat developed by the combustion and will be transformed, therefore, in accordance with its physical characteristics at the moment of its discharge into free air, either into gases or vapours, and either in fusion or aerosols.

The body may also be a non-volatile substance or a suspension of the latter in a volatile substance.

In order to utilise the heating effect of the gaseous flow, the substance or substances which are to be dispersed may be either sprayed or introduced in any other way into contact with the flow of hot gases. Or again they may be introduced in any other way which will allow of the exchange of heat between the substance to be put into use and the flow of gas, for example, by a combination of the two foregoing methods. There may be put into the apparatus, at the same time as the substance which is to be used, one or more other substances intended, for example, to reduce the decomposition of the first, to control the temperature or the composition of the escaping gases or for any other purpose.

The introduction of the substance to be used into the generating device may be carried in any useful manner; for example, in the case of a liquid, by pumping, putting under pressure by means of compressed gas, gravity flow, etc. The driving equipment required in certain cases in order to effect this introduction, can be driven by an electric motor, a piston engine, or by any other kind of apparatus.

Amongst other advantages of the invention, the following may be noted as examples only:

(1) In comparison with the existing kinds of apparatus, the generator assembly is of low weight and only takes up a small space;

(2) The setting to work and in operation is immediate since the mass of material, the temperature of which has to be raised, may be either nil at the first instance or extremely small;

(3) The apparatus may be worked over a very extended period without wear, in particular in the case of the use of a pulsatory chamber as the generator of hot gases.

The description which follows below with respect to the attached drawings (which are given by way of example only and not in any sense by way of limitation) will make it quite clear how the invention may be carried into effect, the special features which are referred to, either in the drawings or in the text, forming, of course, a part of the said invention.

Figs. 1 to 3 show in cross-section three examples of embodiments of the invention in which the substance to be vaporised is introduced into the flow of hot gases.

Figs. 4 and 5 show in cross-section two further examples of embodiments in which the substance to be vaporised is heated in a kind of boiler which is heated in turn by the flow of hot gases.

The apparatus shown in Fig. 1 comprises a pulsatory combustion chamber 2 provided with its air inlet device 1 and its exhaust pipe 3, 4, the rear portion 4 of which is of wider diameter.

In the example shown, the air inlet orifice 1 is of the type which has no mechanical flap-valve, that is to say it comprises a freely open tubular member, the form of which is such that it has a smaller air resistance in the direction of flow of the air which corresponds to the filling of the chamber 2 than in the direction of flow of the combustion gases out to the atmosphere. This tubular member may be constituted by a convergent portion followed by a divergent portion such as described in the U. S. patent application Ser. No. 229,945 filed June 5, 1951, now abandoned, by Jean Le Foll, for "Aerodynamic Flap-Valve."

The combustion chamber 2 includes an ignition plug which is only used for starting up, which is carried out by injecting the fuel, in general, petrol, into the burner 1a and in momentarily passing a blast of compressed air from an auxiliary cylinder or from a fan, into the tube 1. The combustions then begin and are thereafter self-maintaining, as long as the fuel is continued to be injected, at the frequency of the sounding tube constituted by the chamber 2 and its exhaust pipe 3, 4.

The heat of the combustion gases escaping through the exhaust pipe 3, 4, is utilised to vaporise a substance which is to be used between its boiling temperature and the temperature corresponding to the beginning of its decompositon.

In order to do this, an injection of this substance, for example oil, is made by means of an ordinary spraying device 5 inside the exhaust tube 4. When they come into contact with the hot gases issuing from the combustion chamber, the liquid particles of oil are vaporised and are expelled towards the rear at the same time as the combustion gases. As soon as it reaches free air, this vapour condenses in particles of the order of size of one micron thus forming a fog or an aerosol. This condensation of the vapour at the outlet of the exhaust pipe may be accelerated by an arrangement for injecting liquid, water for example, comprising one or more spraying devices arranged in the neighbourhood of the outlet of the exhaust pipe. This spraying action cools down the oil vapour as it leaves the exhaust pipe much more rapidly than does a simple contact with the atmosphere; it also avoids, in certain cases, an excessive size of the tiny drops of oil.

A further spraying of water is necessary in general in order to avoid the body to be dispersed taking fire. This further spraying is carried out by a spray 6a inside the exhaust pipe 4 on the intake side or in the neighbourhood of the spray 5. It enables, in addition, the breaking up and "cracking" of the substance used, to be avoided or to be limited.

The method of embodiment shown in Fig. 2 differs from that preceding in the addition, at the rear of the exhaust tube 4, of a chamber 7, the volume of which is relatively large compared with that of the exhaust pipe, so that a semi-continuous flow of gas at a uniform temperature passes out of the outlet orifice 7a of this chamber. The spraying nozzle 5 for the substance to be dispersed and the water spray device 6a deliver into this chamber.

In the method of embodiment of Fig. 3, which is analogous to that of Fig. 1, the efficiency of the apparatus is increased by causing the fluid to be dispersed to circulate in a tubular member 8 surrounding the combustion chamber 2 or any other high-temperature portion of the apparatus before it is passed to the spray device 5. The fluid recovers in this way a portion of the calories lost through the wall of the apparatus. Any other heat exchanger arrangement can, of course, be used.

In the method of embodiment shown in Fig. 4, the heat transmitted through the wall of the circuit of the hot gases is used to heat and vaporise the substance to be dispersed, the dispersion being produced by the vapour tension of the substance without it being necessary, in general, to mix the said substance with the hot gases.

The tubular exhaust member 3 of the pulsatory combustion chamber 2 whose aerodynamic inlet flap-valve is similar to that described in the U. S. patent application Serial No. 56,582 filed October 26, 1948, now Patent No. 2,670,011, by Jean H. Bertin et François G. Paris, is wound in the form of a spiral in the interior of a boiler 10 closed by the gas-tight walls 11 and 12 and containing the substance to be vaporised. The vapour generated by the heat transmitted to this substance through the wall of the spiral exhaust pipe collects at the top of the cylinder 13 which surrounds the combustion chamber 2 and is expelled by virtue of its own pressure, into the atmosphere through the tubular member 14. The external wall of the combustion chamber 2 and that of the spiral exhaust tube 3 may be fitted with fins in order to increase the coefficient of heat exchange, and which may also serve to control the movement of the fluid in the boiler, the fin members of the exhaust nozzle 3 being made in a spiral in the same way as the exhaust nozzle in order to give the fluid a helicoidal movement from the bottom to the top of the boiler. The fresh fluid to be vaporised arrives in the bottom of the boiler through holes, such as 15, 16. It is led to each of these orifices by tubes 17, 18. These tubes are formed into spirals in the interior of the cylinder 19 which is co-axial with the boiler, into which the exhaust pipe 3 delivers at 20 and which opens to the atmosphere through the orifice 21. The spiral coils 17, 18 thus recover a part of the residual heat of the hot gases and apply it to the fresh fluid brought into the boiler. The presence of several concentric coils (two in the example considered) enable the heat exchanging surface to be increased whilst at the same these coils act as obstacles to the path of the gases, thus muffling the noise of the exhaust.

The form of embodiment of Fig. 5 differs from that preceding by the fact that the combustion chamber 2, provided with its aerodynamic air inlet flap-valve, is partly immersed in the boiler 10 which contains the substance to be vaporised. This boiler is divided by the central cylindrical baffle member 21, which stops short at a little distance from the bottom 11, into two concentric chambers 22, 23. The external chamber 22 which is of annular shape, receives in its upper portion and through the tube member 24, the substance to be vaporised. The internal cylindrical chamber 23 contains the combustion chamber 2 and comprises an outlet orifice 14 for the vapour which is formed. The exhaust pipe 3 of the combination chamber 2 goes down towards the bottom 11 and then rises again by a spiral path towards the exhaust orifice 25 of the gases.

The substance to be vaporised, entering at 24 into the annular chamber 22, begins to be heated up by coming into contact with the spirals of the coil 3 and is finally vaporised in the central chamber 23 by coming into contact with the very hot wall of the combustion chamber, finally passing out at 14 in the condition of vapour.

In order to facilitate the dispersion in the atmosphere of the vapour discharged from the tubular member 14, this vapour can be made to pass out along with the exhaust gases of the pulsatory chamber, or again, as shown in Fig. 5, the tubular member 14 may be arranged so as to form an ejector arrangement supplied from a by-pass 26 of the exhaust gases, thus utilising the kinetic energy of these gases to project the vapour into the air.

In order to prevent decomposition or "cracking" of the substance to be vaporised, there may be arranged, in addition, an injection of water into the hottest portion of the boiler, by means of a spray device or injector 33 supplied by means of a pipe 35, by a pump 32 and a reservoir 34. In general, the output of water is of the order of one tenth of that of the oil to be vaporised. This water may be previously vaporised in an exchanger shown, diagrammatically at 36, which utilises the heat remaining in the exhaust gases. This exchanger will have, furthermore, the supplementary effect of deadening the noise emitted by the said exhaust.

Fig. 5 also shows a fuel pump 29 which supplies the injector 1*a* in the combustion chamber from a reservoir 31 and a pump 28 feeds the boiler 10 with the liquid to be dispersed from the reservoir 30. The pumps 28, 29 and 32 may be driven by a common auxiliary motor 27, for example a small explosion engine.

In order to generate a curtain of smoke or of artificial fog, the substance heated in the boiler of the two preceding examples may be a liquid having a high boiling point (300 to 400°) fed into the boiler at a rate such that the upper level of the liquid in the boiler remains at a height of a few centimetres below the vapour outlet orifice 14.

A particularly adequate liquid will be, for example, anthracinic oil obtained from the distillation of coal tars and clarified so that it does not give any solid deposit at a temperature of zero degree.

The vapour under pressure is expelled from that orifice and condenses at a few centimetres distance from it in the form of a thick smoke. This may be projected into the atmosphere by utilising the energy of the exhaust gases, as has been indicated above.

It should be observed that the generators which have been described are self-supplying in respect of air of combustion and do not comprise any moving member, with the exception of the supply devices, either for the fuel of the combustion chamber or for the substance to be dispersed. They may be used either on the ground or on an aircraft and, in the latter case, they may form part, if need be, of the propulsion unit of that aircraft.

Although in the preceding forms of embodiment, the main consideration has been given to the case of pulsatory combustion chambers for the generation of hot gases applied to the vaporisation of the substance producing the smoke, fog, or aerosol, the invention may be applied to any other kind of apparatus which generates hot gases, for example to turbo-jet units, gas turbine propulsion units or to ram-jet units. These three types of apparatus each comprises an exhaust pipe through which a flow of hot gases passes in a continuous manner. There is thus no difficulty in spraying the substance to be dispersed into this exhaust pipe, as has been described with respect to Figs. 1 to 3. Embodiments similar to those shown in Figs. 4 and 5 may also be applied by by-passing a portion of the hot gases passing through the exhaust pipe and causing them to pass through the coil housed in the boiler.

In the same way, the invention may be applied to the exhaust pipes of internal combustion engines or explosion engines.

It will be quite clear that modifications may be made to the generator which has just been described, in particular by the substitution of equivalent technical means, without thereby departing from the spirit or the scope of the present invention.

What we claim is:

1. Apparatus for generating smoke, artificial fogs, aerosols and like dispersions comprising, in combination, a pulse jet unit having an air intake, a generator of pulses of hot combustion gases and an exhaust duct designed for imparting velocity to said pulses, in series flow arrangement, an accumulator chamber having an inlet connected wtih said duct and an outlet opening to the atmosphere and being otherwise substantially sealed from the atmosphere, the volume of said accumulator chamber being at least equal to the volume required for transforming the pulsating flow of gas entering said chamber into a substantially continuous flow issuing from said outlet, and means for injecting a substance to be dispersed into said accumulation chamber at a point upstream of and remote from said outlet.

2. Apparatus for generating smoke, artificial fogs, aerosols and the like dispersions comprising in combination, a pulse jet unit having an air intake, a generator of pulses of hot combustion gases and an exhaust duct designed for imparting velocity to said pulses, in series flow arrangement, an accumulator chamber having a volume and a flow cross-sectional area substantially larger than the volume and the area of said duct, said chamber having an inlet connected with said duct and an outlet opening to atmosphere and being otherwise substantially sealed from the atmosphere, said accumulator chamber being large enough and said outlet being sufficiently restricted so that no air can enter during any part of the cycle, and means for injecting a substance to be dispersed into said accumulator chamber at a point upstream of and remote from said outlet.

3. Apparatus as claimed in claim 2, wherein the chamber is connected with the duct through a diverging tubular section.

4. Apparatus as claimed in claim 1, further comprising means for injecting water outside the chamber, in the vicinity of the outlet thereof.

5. Apparatus as claimed in claim 1, further comprising means for injecting water into the chamber.

References Cited in the file of this patent

UNITED STATES PATENTS

| | | |
|---|---|---|
| 2,173,756 | Kronenberg | Sept. 19, 1939 |
| 2,364,199 | Derr | Dec. 5, 1944 |
| 2,476,171 | Williams | July 12, 1949 |
| 2,738,334 | Tenney et al. | Mar. 13, 1956 |

FOREIGN PATENTS

| | | |
|---|---|---|
| 673,481 | Great Britain | June 4, 1952 |

OTHER REFERENCES

Karcher, A.: Device for the Production of Fogs and the Like, (German) publication by Office of Technical Services, release date June 11, 1948, Frames 8907–8911, Reel 83291 of microfilm.